United States Patent [19]

Lazenby et al.

[11] 3,795,861

[45] Mar. 5, 1974

[54] APPARATUS FOR ANALYSING TRANSIENTS IN A PERIODIC SEQUENCE OF SIGNALS

[76] Inventors: Peter G. Lazenby, 13 Shadylawn Cres., Streetsville; Hendrik M. Wondergem, 38 Dixington Cres., Weston, Ontario, both of Canada

[22] Filed: Feb. 20, 1973

[21] Appl. No.: 333,973

[52] U.S. Cl. .................... 324/102, 324/4, 324/77 A
[51] Int. Cl. ...................... G01r 27/28, G01r 19/00
[58] Field of Search .......... 324/102, 103 R, 103 P, 4, 324/77 A; 328/151

[56] References Cited
UNITED STATES PATENTS
3,278,846   10/1966   Patten et al. ..................... 324/77 A

*Primary Examiner*—Alfred E. Smith
*Assistant Examiner*—Ernest F. Karlsen

[57] ABSTRACT

In an apparatus for analysing transients in a periodic sequence of signals, a signal averager is used for averaging sequential portions of a repetitive waveform characteristic of a sequence of the transients. In order to compensate for unwanted transient components determined by spurious variations in the peak amplitudes of the incoming signals, a peak detector having a number of independently adjustable output circuits is used to derive compensation signals from the incoming signals, the compensation signals being compounded with the sequential portions of the repetitive waveform.

11 Claims, 4 Drawing Figures

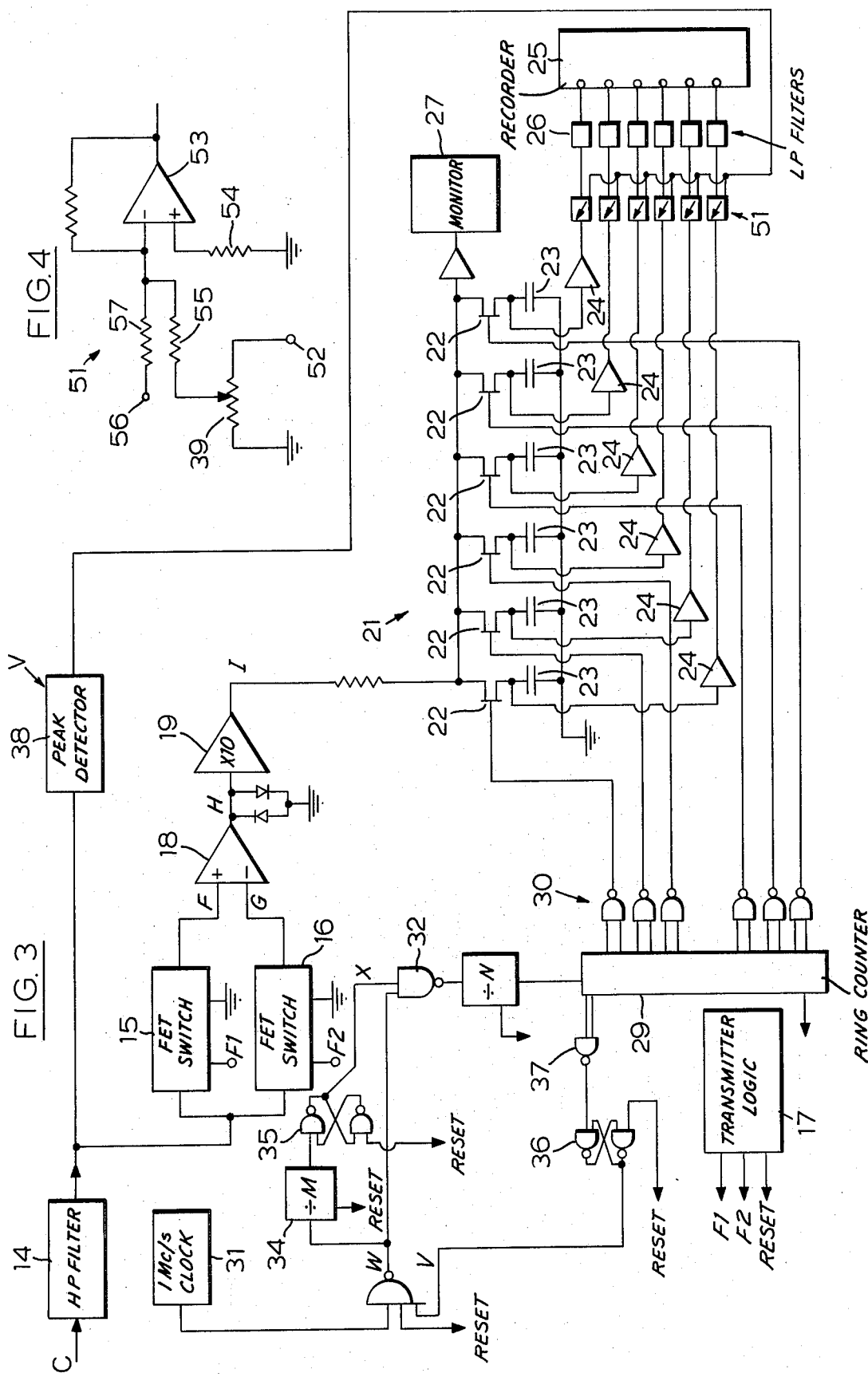

APPARATUS FOR ANALYSING TRANSIENTS IN A PERIODIC SEQUENCE OF SIGNALS

This invention relates to an apparatus for analysing transients in a periodic sequence of signals and occurring during quiescent periods between the signals.

The invention is more particularly concerned with apparatus for the remote detection of conducting bodies, such as ore bodies, wherein a transmitter is used to generate a primary electromagnetic waveform exhibiting abrupt discontinuities at intervals so as to induce in a remote conducting body secondary signals which are reradiated together with any transient components thereof by the conducting body, the apparatus further including a receiver for discerning the reradiated signals, and means for sampling and analysing the transient components of such signals to derive information relating to the conducting ore body. One such apparatus is described in copending application, Ser. No. 117,444 filed on Feb. 22, 1971 by Peter G. Lazenby and Hendrik M. Wondergem, and entitled Apparatus for the Remote Detection of Conducting Bodies.

In practice, it is found that the transients to be sampled and analysed may have unwanted components which if uncorrected, would distort or falsify the information derived from their analysis. Such unwanted components may result from a number of causes, including overdamping or underdamping of the receiver coil, and the generation of eddy currents in metal structures in the immediate vicinity of the apparatus. Unwanted components would present no problem if they remained constant in time. However, they do vary linearly with the amplitude of the signals received by the receiver directly from the transmitter, this amplitude changing whenever the coupling between the receiver and transmitter coils changes. The spurious generation of unwanted transient components during the quiescent periods between the signals therefore presents a serious problem in the case of an airborne apparatus, wherein the receiver is carried by a "bird" which is towed behind the aircraft carrying the transmitter.

The primary object of the present invention is to provide, in an apparatus for analysing transients in a periodic sequence of signals and occurring during quiescent periods between the signals, which transients have unwanted components determined by spurious variations in the peak amplitudes of such signals, means responsive to such peak amplitudes to compensate for said unwanted components.

In order that the invention may be readily understood, three embodiments thereof, as applied to aerial survey apparatus of the type described in the above identified application, Ser. No. 117,444, will now be described by way of example with reference to the accompanying drawings, in which:

FIG. 3 is a block diagram of a third apparatus according to the invention; and

FIG. 4 illustrates a detail of the apparatus of FIG. 3.

The structure of the apparatus, other than the particular electronic circuitry for processing the secondary signals discerned by the receiving means, is described in U.S. Pat. No. Re.25908, in the name A.R. Barringer, and dated Nov. 16, 1965, the contents of which are incorporated herein by reference. The apparatus includes three mutually perpendicular inductive receiving coils for detecting the three components of a secondary field, each coil being associated with its respective receiving system. The three receiving systems are essentially similar in their arrangement and operation, and to avoid undue repetition only one such system of each embodiment will be described herein.

Figure 1:
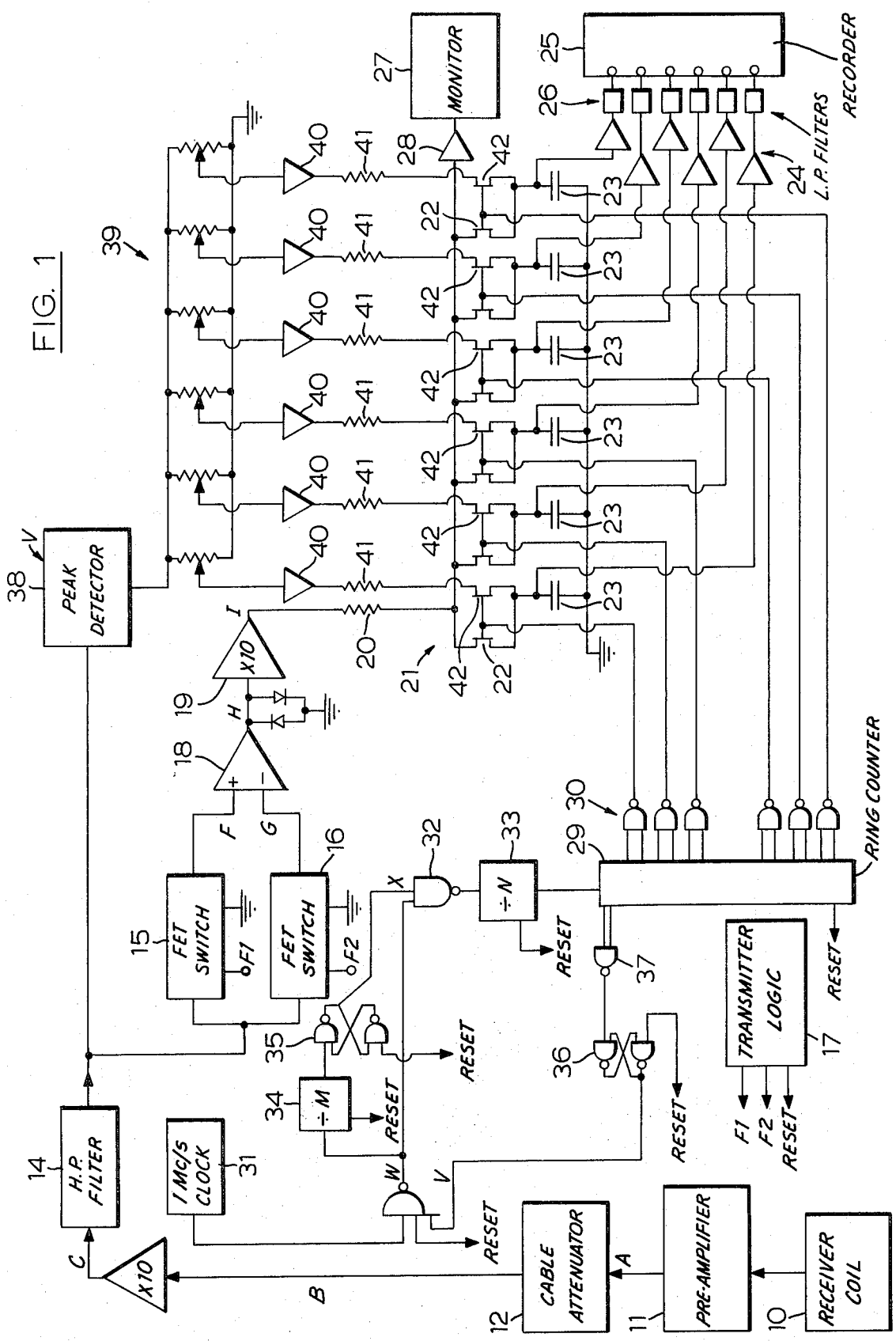
FIG. 1 is a block diagram of one apparatus according to the invention.

In the apparatus of FIG. 1, a pulse generator (not shown) for generating a sequence of pulses is coupled to a transmitter which radiates a primary electromagnetic field having a waveform which exhibits abrupt discontinuities at times determined by the sequence of pulses. The recurrence frequency of the pulses, while typically being of the order of 280 pulses per second, is not critical, for reasons that will later become apparent. The primary electromagnetic field, if radiated towards a conducting body such as a massive sulphide ore deposit, induces a secondary current in the conducting body which reradiates secondary signals together with any transient components of such signals. The secondary signals and transients are received by a ferrite core receiving coil 10, the received signal being amplified by a low noise preamplifier 11. The amplified secondary signal, A, typically may have a peak to peak amplitude of two volts. The amplified signal is then fed through an a.c.-coupled cable attenuator 12, the attenuated signal B from which typically has a peak to peak amplitude of 200 mV. The output signal B from the cable attenuator 12 is again amplified by an amplifier 13 to minimize the effect of pedestals in the subsequent circuitry which employs field effect transistors. The signal B is of alternating polarity and of a form representing the complete secondary signal with transient components thereof; the subsequent circuitry is designed to rectify and isolate the transient components, thereby to derive a repetitive waveform characteristic of a sequence of the secondary transients. The amplified output signal C, after being passed through a high pass filter 14, is applied to two parallel FET switches 15, 16, which are triggered alternately by triggering pulses F1 and F2 derived from the transmitter logic 17 for gating waveforms F and G of opposite polarities, the latter waveforms being applied respectively to the opposite polarity input terminals of a differential amplifier 18, whose output H is the desired repetitive waveform of one polarity representing a sequence of secondary transient components. The waveform H is amplified by an amplifier 19, the amplified output I of which is applied through a resistor 20 to the input of a memory unit 21. The memory unit 21 has six parallel connected memory elements each consisting of a field effect transistor 22 and a capacitor 23. The point of connection between the field effect transistor 22 and capacitor 23 is connected through a respective one of six buffer amplifiers 24 to an input channel of a recorder 25. The outputs of the buffer amplifiers 24 are smoothed by low pass filters 26 having a roll-off frequency of about 20 c/s. A monitor 27 is provided for monitoring the output of the memory unit, the latter having a monitoring terminal which is connected to the monitor by way of a buffer amplifier 28.

The field effect transistors 22 are gated sequentially by pulses occurring over selected periods of the recurrent cycle, so that the memory unit 21 is scanned to provide on each of its six output channels outputs which represent the average values of the selected portions of the repetitive waveform. The scanning pulses are derived from an 8-stage Johnson ring counter 29, whose output terminals are selectively connected in pairs to the inputs of six NAND gates 30, the sequentially gated outputs being used to trigger the field effect transistors 22. The Johnson ring counter 29 is triggered in the following manner. Pulses from a 1 Mc/S clock oscillator 31 are gated with a reset signal from the transmitter logic 17 and with a hold-off signal V, the gated signal W being gated with a time delayed signal X by a NAND gate 32 and applied to a frequency divider 33, the output from which is used to trigger the ring counter 29. The time delayed signal X is derived by applying the signal W to a frequency divider 34, the output of which operates a toggle switch 35 connected to one terminal of the NAND gate 32. The hold-off signal V is derived from a toggle circuit 36 actuated by an end of sweep signal, the end of sweep signal being derived by gating the outputs of the appropriate two terminals of the Johnson ring counter by means of a NAND gate 37.

In operation of the system, after a predetermined delay following the occurrence of each reset pulse, the delay being determined by the circuit 34, 35 and 32, a train of trigger pulses is generated at a frequency determined by the clock oscillator 31 and the frequency divider 33. The pulses are fed to the input of the ring counter 29, from which are derived six sequential pulses by which the field effect transistors 22 are triggered, thus gating in sequence the contents of the six memory locations of the memory unit 21. As described so far, this embodiment of the invention is identical with one of the systems described in the above identified application, Ser. No. 117,444. However, the circuit illustrated in FIG. 1 includes means to compensate for unwanted components of the transients to be recorded. Such means will now be described.

The sequence of signals C is applied to a peak detector 38, the peak detector being reset prior to the reception of each signal of the sequence by means of the hold-off signal V derived from the toggle circuit 36. The output of the detector at any time is therefore proportional to the peak amplitude of the current signal of the sequence. Six potential dividers 39, there being as many potential dividers as there are channels in the memory unit 21, are connected in parallel across the output of the peak detector 38. The potential dividers are individually adjustable, and each potential divider derives from the peak detector a compensation signal which is proportional to the peak amplitude of the current signal of the sequence being received. The outputs of the potential dividers are applied through buffer amplifiers 40, resistors 41, and field effect transistors 42, to the output terminals of the memory unit 21. The gates of the field effect transistors 42 are connected to the gates of the field effect transistors 22, channel by channel so as to be gated sequentially in synchronism therewith. The memory unit 21 connected to the field effect transistors 42 in this way thus acts as a summing device, the contents of each channel, or memory location, at the time it is transmitted to the recorder 25, being the resultant of a sequential portion of the waveform I and the respective compensation signal derived from the potential divider 39. The polarities of the signals, and the adjustments of the potential dividers, are such that the output from each channel corresponds to the average value of a selected portion of a transient less any component thereof which is a mere linear function of the signal peak amplitude.

Figure 2:
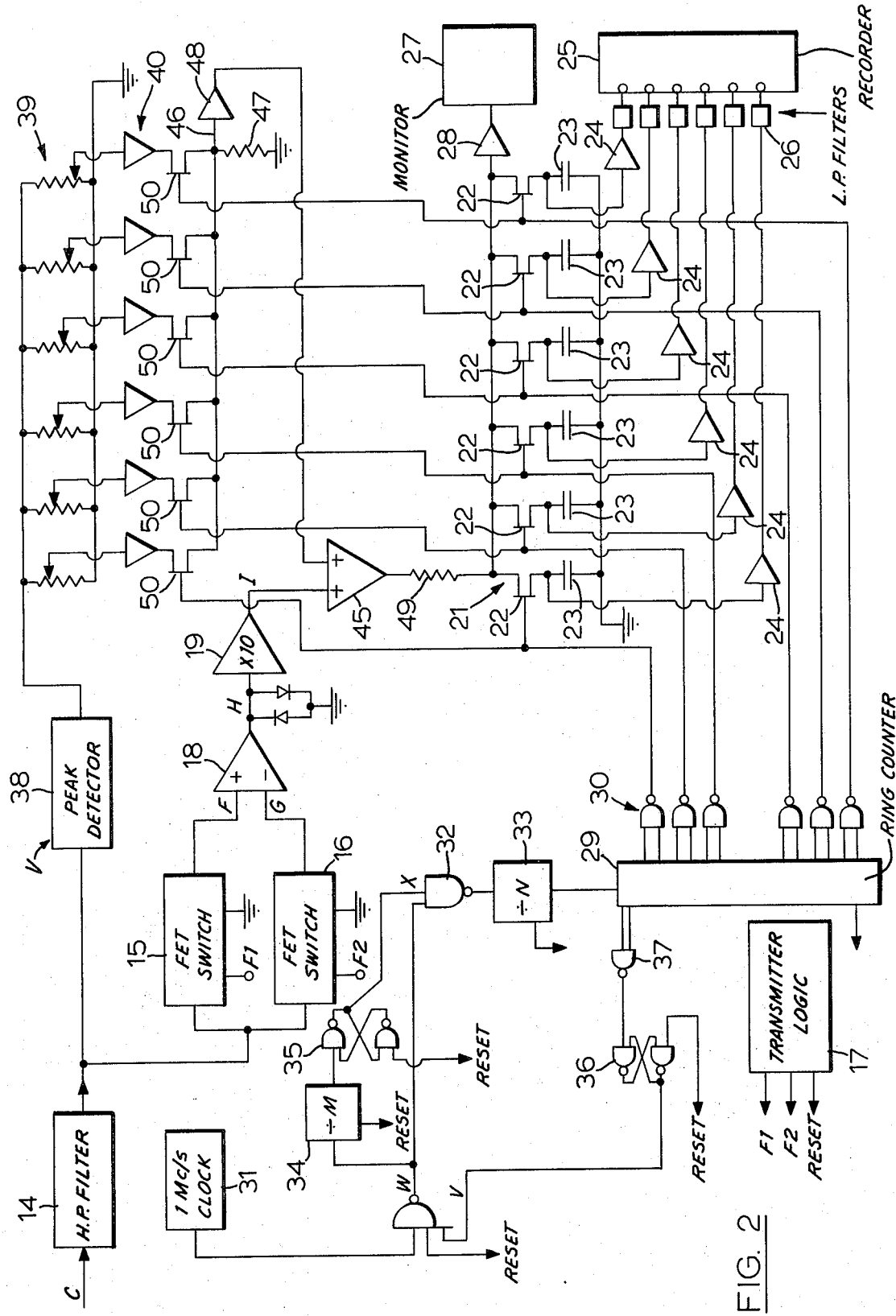
FIG. 2 is a block diagram of a second apparatus according to the invention.

In the circuit illustrated in FIG. 2, components thereof which are identical to corresponding components in FIG. 1 are denoted by the same reference numerals and will not further be described. This second embodiment of the invention differs from the first embodiment in that the repetitive waveform I, which is characteristic of a sequence of the transients to be analysed, is applied to one input terminal of a summing amplifier 45, the other input terminal of the summing amplifier being connected to receive the compensation signals from the potential dividers 39 and buffer amplifiers 40. The compensation signals are applied through field effect transistors 50, there being one for each channel, to a bus 46 connected to ground through a resistor 47, the compensation signals being amplified by a buffer amplifier 48. The output terminal of the summing amplifier 45 is connected to the input of the memory unit 21 via a resistor 49. The gates of the field effect transistors 50 are connected to the gates of the respective field effect transistors 22 so as to be gated sequentially in synchronism therewith by the ring counter 29. Thus, the output of each channel of the memory unit, determined by the synchronous operation of a pair of field effect transistors 50 and 22, is a compounded signal corresponding to the average value of a selected portion of the repetitive waveform compensated for unwanted transient components.

In the circuit illustrated in FIGS. 3 and 4, components which are identical to corresponding components of FIG. 1 are denoted by the same reference numerals and will not be described further. This embodiment differs from the preceding embodiments, in that the compensation signals are compounded with the outputs from the channels of the memory unit 21, the compounding circuits, one for each channel, being denoted by the reference numeral 51 in FIG. 3 and being shown in greater detail in FIG. 4. As illustrated in FIG. 4, each unit 51 comprises a potential divider 39 which is connected to the output terminal of the peak detector 38 by the terminal 52. The unit includes a differential amplifier 53, one terminal of which is connected to ground by a resistor 54, and the other terminal of which is connected both to the tapping of the potential divider 39 via a resistor 55 and to the output terminal 56 of a respective one of the buffer amplifiers 24 (FIG. 3) via a resistor 57. The output of the summing amplifier 53 is connected to the respective input channel of the recorder 25 through the low pass filter 26.

The circuits described above may be modified without departing from the scope of the invention. For example, the amplitude detector means, which in the illustrative embodiments comprises a peak detector in combination with means for resetting the peak detector prior to the reception of each of said signals, may take the form of a sample hold circuit. A sample hold circuit is advantageous if the times of occurrence of the signal peaks are known, as in the systems described herein.

What we claim as our invention is:

1. In an apparatus for analysing transients in a periodic sequence of signals and occurring during quiescent periods between the signals, which transients have unwanted components determined by spurious variations in the peak amplitudes of said signals:
   a. means for deriving a repetitive waveform characteristic of a sequence of said transients;

b. amplitude detector means connected to receive said sequence of signals;
c. a plurality of potential dividers connected to the output of the amplitude detector means, each potential divider deriving a compensation signal which is proportional to the peak amplitude of the current signal of the sequence;
d. summing means having a first input circuit connected to receive the repetitive waveform, a second input circuit connected to receive the compensation signals, and an output circuit;
e. sequentially operable gating means connected in circuit with said summing means for gating sequential portions of the repetitive waveform with respective ones of said compensation signals;
f. signal averaging means in circuit with said gating means for averaging said sequential portions of the repetitive waveform; and
g. recording means connected in the output circuit of said summing means.

2. Apparatus as claimed in claim 1, wherein said amplitude detector means comprises a peak detector and means for resetting the peak detector prior to the reception of each said signal.

3. In an apparatus for analysing transients in a periodic sequence of signals and occurring during quiescent periods between the signals, which transients have unwanted components determined by spurious variations in the peak amplitudes of said signals:
a. input means for deriving a repetitive waveform characteristic of a sequence of said transients;
b. a signal averager connected to said input means to receive said repetitive waveform, the signal averager providing a plurality of output channels;
c. sequentially operable gating means connected in circuit with the signal averager for gating the outputs of said channels in cyclic sequence, said outputs representing the average values of sequential portions of the repetitive waveform;
d. timing means for sequentially operating said gating means;
e. amplitude detector means connected to receive said sequence of signals;
f. a plurality of potential dividers connected to the output of the amplitude detector means, each potential divider deriving a compensation signal which is proportional to the peak amplitude of the current signal of the sequence;
g. a plurality of summing amplifiers each having a first input circuit, a second input circuit, and an output circuit, the first input circuit of each summing amplifier being connected to a respective one of said output channels, and the second input circuit of each summing amplifier being connected to a respective one of said potential dividers to receive the compensation signal therefrom; and
h. recording means having a plurality of input channels connected respectively to said output circuits, of the summing amplifiers.

4. Apparatus as claimed in claim 3, wherein said amplitude detector means comprises a peak detector and means for resetting the peak detector prior to the reception of each said signal.

5. Apparatus as claimed in claim 3, wherein said potential dividers are independently adjustable.

6. In an apparatus for analysing transients in a periodic sequence of signals and occurring during quiescent periods between the signals, which transients have unwanted components determined by spurious variations in the peak amplitudes of said signals;
a. input means for deriving a repetitive waveform characteristic of a sequence of said transients;
b. amplitude detector means connected to receive said sequence of signals;
c. a plurality of potential dividers connected to the output of the amplitude detector means, each potential divider deriving a compensation signal which is proportional to the peak amplitude of the current signal of the sequence;
d. a signal averager providing a plurality of channels, each channel including a first input circuit connected to said input means to receive said repetitive waveform, a second input circuit connected to a respective one of said potential dividers to receive the compensation signal therefrom, and an output circuit including averaging means;
e. first sequentially operated gating means connected in said first input circuits for gating sequential portions of said repetitive waveform to said output circuits;
f. second sequentially operated gating means connected in said second input circuits and connected to the first gating means for synchronous operation therewith;
g. timing means for sequentially operating said first and second gating means, the outputs of said channels representing sequential portions of said repetitive waveform; and
h. recording means having a plurality of input channels connected respectively to said output circuits of the signal averager.

7. Apparatus as claimed in claim 6, wherein said amplitude detector means comprises a peak detector and means for resetting the peak detector prior to the reception of each said signal.

8. Apparatus as claimed in claim 6, wherein said potential dividers are independently adjustable.

9. In an apparatus for analysing transients in a periodic sequence of signals and occurring during quiescent periods between the signals, which transients have unwanted components determined by spurious variations in the peak amplitudes of said signals:
a. input means for deriving a repetitive waveform characteristic of a sequence of said signals;
b. amplitude detector means connected to receive said sequence of signals;
c. a plurality of potential dividers connected to the output of the amplitude detector means, each potential divider deriving a compensation signal which is proportional to the peak amplitude of the current signal of the sequence;
d. a summing amplifier having a first input circuit connected to said input means to receive said repetitive waveform, a second input circuit connected to said potential dividers to receive said compensation signals, and an output circuit;
e. said second input circuit including a plurality of sequentially operable gates for gating the compensation signals sequentially to the summing amplifiers;
f. timing means for sequentially operating said gates;
g. a signal averager connected in the output circuit of the summing amplifier, the signal averager providing a plurality of channels and a plurality of gates connected to said timing means for gating the outputs of said channels in synchronism with the operation of the gates of said second input circuit, the channel outputs representing sequential portions of the repetitive waveform; and h. recording means having a plurality of input channels connected respectively to said output channels.

10. Apparatus as claimed in claim 9, wherein said amplitude detector means comprises a peak detector and means for resetting the peak detector prior to the reception of each said signal.

11. Apparatus as claimed in claim 9, wherein said potential dividers are independently adjustable.

* * * * *